Nov. 29, 1966   H. GRÜNBAUM   3,287,935
FRICTION CLUTCH
Filed June 10, 1964

INVENTOR
HEINRICH GRÜNBAUM
BY
Michael J. Striker
ATTORNEY

United States Patent Office 3,287,935
Patented Nov. 29, 1966

3,287,935
FRICTION CLUTCH
Heinrich Grünbaum, Binningen, Switzerland, assignor to Dr. C. Schachenmann & Co., Basel, Switzerland
Filed June 10, 1964, Ser. No. 373,961
11 Claims. (Cl. 64—30)

The present invention relates to a friction clutch, and more particularly to an axial friction clutch.

It is an important object of the invention to provide a clutch wherein the friction between the driving and driven parts may be regulated within a wide range so that the operator may control the magnitude of driving torque which is being transmitted to the driven part.

Another object of the invention is to provide a very simple friction clutch of the above outlined characteristics which comprises a small number of component parts, wherein the magnitude of driving torque to be transmitted to one or more driven parts may be regulated by hand, which may be constructed in many different sizes and shapes, which occupies little room, and which may be used to transmit driving torque between parts which need not be in perfect axial alignment with each other.

A further object of the invention is to provide a friction clutch which may transmit driving torque in both directions and wherein the means for creating friction may consist of one or more simple and readily available resilient elements.

A concomitant object of the invention is to provide a friction clutch which may be assembled or taken apart with little loss in time, wherein the friction between driving and driven parts may be regulated with great precision, and wherein such regulation may be effected in a number of ways, either by replacing the friction generating means or by adjusting the bias of such friction generating means.

With the above objects in view, one feature of my invention resides in the provision of a friction clutch or overload clutch which comprises two coupling members including a rotary driving member, a rotary driven member which is coaxial with the driving member, an annular clutch element coaxial with and non-rotatably secured to one of the coupling members, means for biasing the clutch element into permanent frictional engagement with the other coupling member so that the driving member may transmit to the driven member a driving torque whose magnitude depends on the momentary bias upon the clutch element, and means for regulating the action of biasing means upon the clutch element. The biasing means may consist of a package of dished springs, of one or more helical springs or of a combination of different types of springs. That coupling member which is in frictional engagement with the clutch element is preferably provided with a collar which abuts against one end face of the clutch element, and this element is preferably provided with claws or similar projections which extend into complementary recesses or slots of the other coupling member, or vice versa, so that the clutch element is in positive engagement therewith. In other words, an important feature of the invention resides in the provision of a friction clutch in which the clutch element is in positive motion transmitting or motion receiving engagement with one of two coaxial coupling members but is in mere frictional engagement with the other coupling member whereby the magnitude of friction may be selected by varying the bias upon the clutch element.

The novel features which are considered as characteristic of the invention are set forth in particular in the appended claims. The improved friction clutch itself, however, both as to its construction and its mode of operation, together with additional features and advantages thereof, will be best understood upon perusal of the following detailed description of certain specific embodiments with reference to the accompanying drawings, in which:

Figure 1:
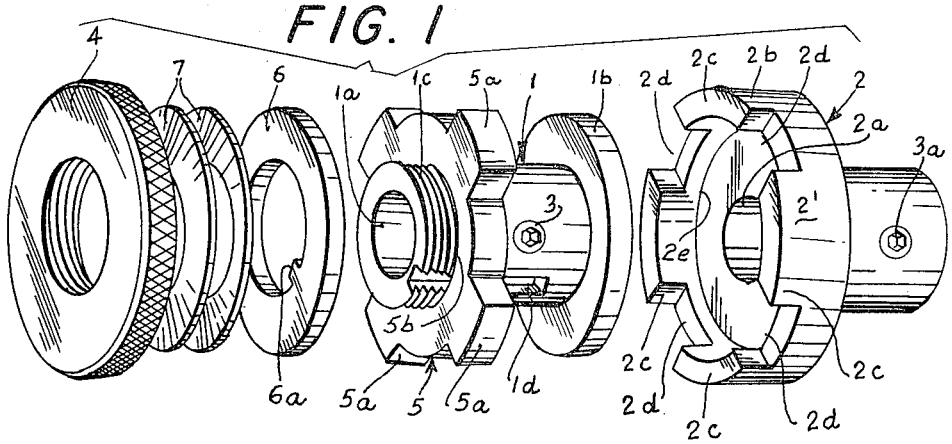
FIG. 1 is an exploded perspective view of a friction clutch which embodies one form of my invention and wherein the biasing means comprises a package of dished springs.
Figure 2:
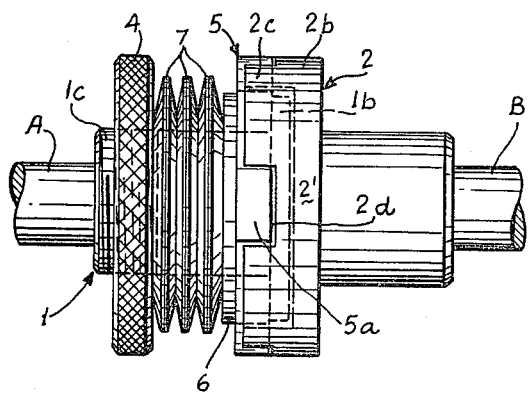
FIG. 2 is a side elevational view of the clutch in fully assembled condition in which its parts serve to transmit driving torque between a pair of coaxial shafts.

Referring to the drawings, and first to FIGS. 1 and 2, there is shown a friction clutch of the type known as axial clutch which serves to transmit driving torque from a first shaft A to a second shaft B or vice versa. The two shafts are in axial alignment and each thereof is detachably connected with one of two specially configurated coupling members 1 and 2. In the illustrated embodiment, the shaft A is assumed to be the one which is driven by a suitable motor or transmission, not shown, and this "driver" shaft is connected with the "driving" member 1 by means of a radial screw 3. The end portion of the shaft A is received in the axial bore 1a of the driving member 1 which latter comprises an annular flange or collar 1b at one end and an externally threaded portion 1c at the other end thereof. There is an axially parallel groove 1d which is provided in the periphery of the driving member 1 and extends from the left-hand end face all the way to or in close proximity of the flange 1b.

The shaft B will be called "driven" shaft; its end portion is received in the axial bore 2a of the "driven" coupling member 2 and is secured thereto by a radial screw 3a. At its left-hand end, the driven member 2 is provided with a cupped or bell-shaped portion 2' whose open end faces the driving member 1 and whose cylindrical wall is provided with four equidistant axially extending recesses or slots 2d which alternate with four axially extending eccentric peripheral projections in the form of claws or teeth 2c. The recesses 2d extend inwardly from the left-hand end face of the cupped portion 2'.

The clutch further comprises composite biasing means including a series of dished springs 7 (only two shown in FIG. 1), a metallic washer 6 which is provided with a radially inwardly extending tongue 6a receivable in the groove 1d, and a knurled disk-shaped nut 4 which serves as a means for regulating the bias of the springs 7 and which may mesh with the externally threaded end portion 1c of the driving member 1.

When the clutch of FIGS. 1 and 2 is assembled, the operator inserts the end portions of the shafts A, B into the bores 1a, 2a and drives the screws 3, 3a into the hollow cylindrical portions or hubs of the respective coupling members to such an extent that the parts 1, A and 2, B form two rigid units. In the next step, the collar 1b is inserted in the cupped portion 2', and the operator then applies an annular clutch element 5 which is provided with four radially outwardly extending equidistant projections here shown as claws or teeth 5a adapted to enter into the recesses 2d and to engage with the claws 2c so as to insure that the clutch element 5 must share all angular movement of the driven unit 2, B. At the same time, the claws 2c enter the recesses between the claws 5a. It will be noted that the claws 5a, 2c and the recesses 2d surround the periphery of the collar 1b, i.e., the claws 5a are provided on that portion of the clutch element 5 which extends radially outwardly and beyond the collar 1b. The bore 5b of the clutch element 5 is large enough to allow for sliding movement of this element about the threaded end portion 1c and all the way in actual abutment with the left-hand end face of the collar 1b. In the final step, the operator forms a stack of dished springs 7 (FIG. 2 shows that the fully assembled clutch comprises six dished springs), and the nut 4 is screwed onto the end portion 1c to an extent which is considered necessary to insure that the clutch will transmit a driving torque of desired magnitude. The washer 6 is placed between the left-hand and face of the clutch element 5 and the rightmost dished spring 7 to prevent rotation of the biasing means with reference to the driving member 1 even though the springs need not be positively coupled to this driving member. The package of springs 7 will bias the right-hand end face the clutch element 5 against the left-hand end face of the collar 1b so that the parts 1, A, 4, 5, 6, 7, 2 and B will rotate as a unit until the shaft B begins to offer such resistance to rotation that the bias of the springs 7 is overcome and the coupling member 1 and the washer 6 will begin to rotate with reference to the clutch element 5. The latter is compelled to share all rotary movements of the coupling member 2 because the claws 2c, 5a are in mesh.

The diameter of the peripheral surface 2b on the cupped portion 2' of the coupling member 2 equals the maximum diameter of the clutch element 5. The depth of the cylindrical chamber 2c in the left-hand end face of the member 2 is such that it exceeds at least slightly the axial length of the collar 1b. The heads of the screws 3, 3a are recessed all the way in the cylindrical portions of the coupling members 1, 2 respectively. The clutch element 5 may consist of metallic or synthetic plastic material which is resistant to wear and which will be capable of transmitting substantial driving torque. The diameter of the annular central portion of the clutch element equals the maximum diameter of the collar 1b.

Figure 3:
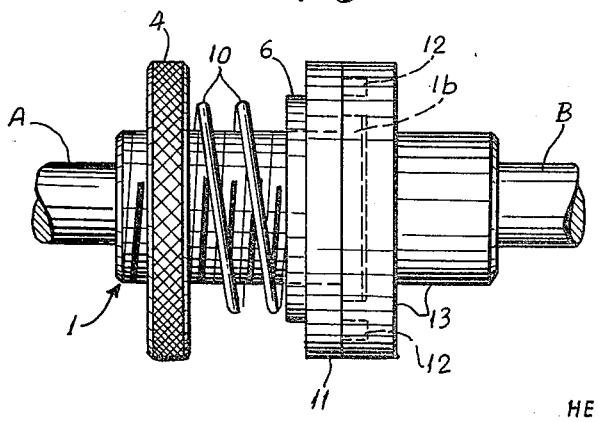
FIG. 3 is a side elevational view of modified friction clutch wherein the biasing means comprises a helical spring.

FIG. 3 illustrates a slightly modified axial friction clutch wherein the package of dished springs 7 is replaced by a helical spring 10. Also, the clutch element 5 is replaced by an annular element 11 which is provided with eccentric axially extending projections in the form of teeth or studs 12 received in recesses here shown as axially extending eccentric holes provided in the left-hand end face of a driven coupling member 13. An advantage of this clutch is that it may be assembled more rapidly because the biasing means comprises a single spring. Other types of biasing means may be used if desired. The projections 12 may be replaced by axial claws which then extend into complementary recesses of the driven coupling member, or vice versa.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A friction clutch, comprising a first rotary coupling unit including a first coupling member; a second rotary coupling unit located substantially coaxially with respect to said first coupling unit, said second coupling unit including a coupling element having a substantially cylindrical portion substantially coaxial with said first coupling member and a radially extending transverse wall portion, an annular clutch member rotatably and slidably received on said substantially cylindrical portion of said first coupling element, and biasing means provided on said first coupling element and arranged to bias said clutch member axially into frictional engagement with said transverse wall portion; connecting means provided on said members for constraining the latter for simultaneous rotational movement about their common axis and for permitting said members to move freely out of engagement with each other in axial direction in response to movement of one of said coupling units axially away from the other coupling unit, without affecting the bias of said biasing means, said coupling units transmitting between themselves a driving torque whose magnitude depends on the bias of said biasing means when said members are connected for simultaneous rotational movement.

2. A friction clutch according to claim 1, said connecting means comprising an axial projection on one of said members and a radially extending wall portion provided on the other of said members for engaging said projection whereby said members are constrained for simultaneous rotational movement about said axis, said axial projection and said radially extending wall portion in engagement therewith being adapted to freely axially slide with respect to each other to a position where they are no longer in engagement in response to movement of one of said coupling units away from the other coupling unit in axial direction.

3. A friction clutch according to claim 1, further comprising a washer disposed intermediate said biasing means and said clutch element, said washer being axially movably supported on said cylindrical portion of said coupling element, and means connecting said washer for rotation with said coupling element.

4. A friction clutch according to claim 1, wherein said biasing means includes resilient means comprising a package of annular dished springs provided on the cylindrical portion of said coupling element and arranged to bias said clutch member axially, said coupling element being provided with a collar constituting said transverse wall portion on the side of said clutch member opposite said springs, said springs being arranged to bias said clutch element into frictional engagement with said collar.

5. A friction clutch according to claim 1, wherein said biasing means includes resilient means comprising a helical spring provided on the cylindrical portion of said coupling element, said coupling element including a collar on the side of said clutch member opposite said helical spring, said collar constituting said transverse wall portion, and said helical spring being arranged to bias said clutch member axially into frictional engagement with said collar.

6. A friction clutch, comprising a first coupling unit including a first rotary coupling member including a cylindrical portion and a cupped portion integral with one end of said cylindrical portion, said cupped portion having an eccentrically located axially extending recess; a second coupling unit located substantially coaxially with respect to said first coupling unit and coupled to the latter in mere torque transmitting relationship therewith, said second coupling unit including a second rotary coupling member comprising a cylindrical portion coaxial with said first coupling member and a collar provided at one end of said last named cylindrical portion and extending into said cupped portion, an annular clutch element rotatably received on the cylindrical portion of said second coupling member and comprising a projection received in said recess so that the clutch element is compelled to rotate with said first coupling member, resilient means provided on the cylindrical portion of said second coupling member and arranged to bias said clutch element axially into frictional engagement with said collar so that one of said coupling members may transmit to the other coupling member a driving torque whose magnitude depends on the bias of said resilient means, and means on said second coupling member for regulating the bias of said resilient means, said projection being adapted to move freely out of said axially extending recess in response to movement of one of said coupling units away from the other coupling unit in axial direction so that said coupling units may be readily separated from one another without affecting the bias of said resilient means; and means for driving one of said coupling units.

7. A friction clutch, comprising a first coupling unit including a first rotary coupling member including a hollow hub and a cupped portion integral with one end of said hub, said cupped portion having an eccentrically located axially extending recess; a second coupling unit located substantially coaxially with respect to said first coupling unit and coupled to the latter in mere torque transmitting relationship therewith, said second coupling unit including a second rotary coupling member comprising a hollow hub coaxial with said first coupling member and a collar provided at one end of said last named hub and extending into said cupped portion, said last named hub being provided with external threads, an annular clutch element rotatably received on the hub of said second coupling member and comprising a projection received in said recess so that the clutch element is compelled to rotate with said first coupling member, resilient means provided on the hub of said second coupling member and arranged to bias said clutch element axially into frictional engagement with said collar so that one of said coupling members may transmit to the other coupling member a driving torque whose magnitude depends on the bias of said resilient means, and a nut meshing with the hub of said second coupling member and arranged to regulate the bias of said resilient means in response to angular displacement thereof with reference to said second coupling member, said projection being adapted to move freely out of said axially extending recess in response to movement of one of said coupling units away from the other coupling unit in axial direction so that said coupling units may be readily separated from one another without affecting the bias of said resilient means; a driver shaft extending into and secured to the hub of said one of said coupling members; and a driven shaft extending into and secured to the hub of the other of said coupling members.

8. A friction clutch, comprising a first coupling unit including a first rotary coupling member including a cylindrical portion and a cupped portion integral with one end of said cylindrical portion, said cupped portion having an eccentrically located axially extending recess; a second coupling unit located substantially coaxially with respect to said first coupling unit and coupled to the latter in mere torque transmitting relationship therewith, said second coupling unit including a second rotary coupling member comprising a cylindrical portion coaxial with said first coupling member and a collar provided at one end of said last named cylindrical portion and extending into said cupped portion, said last named cylindrical portion being provided with external threads, an annular clutch element rotatably received on the cylindrical portion of said second coupling member and comprising a projection received in said recess so that the clutch element is compelled to rotate with said first coupling member; resilient means provided on the cylindrical portion of said second coupling member and arranged to bias said clutch element axially into frictional engagement with said collar so that one of said coupling members may transmit to the other coupling member a driving torque whose magnitude depends on the bias of said resilient means, a washer disposed intermediate said resilient means and said clutch element, means connecting said washer for rotation with said second coupling member, and a nut meshing with the cylindrical portion of said second coupling member and arranged to regulate the bias of said resilient means in response to angular displacement thereof with reference to said second coupling member, said projection being adapted to move freely out of said axially extending recess in response to movement of one of said coupling units away from the other coupling unit in axial direction so that said coupling units may be readily separated from one another without affecting the bias of said resilient means; and means for driving said one coupling unit.

9. A friction clutch as set forth in claim 8, wherein said clutch element extends radially outwardly beyond said collar and wherein said projection extends radially and is adjacent to the periphery of said collar.

10. A friction clutch, comprising a first coupling unit including a first rotary coupling member including a cylindrical portion and a second portion integral with one end of said cylindrical portion, said second portion having an eccentrically located axially extending projection; a second coupling unit located substantially coaxially with respect to said first coupling unit and coupled to the latter in mere torque transmitting relationship therewith, said second coupling unit including a second rotary coupling member comprising a cylindrical portion coaxial with said first coupling member and a collar provided at one end of said last named cylindrical portion and extending into the region adjacent said second portion, said last named cylindrical portion being provided with external threads and said projection being of sufficient length so as to extend axially beyond said collar into the region of said last named cylindrical portion, an annular clutch element rotatably received on the cylindrical portion of said second coupling member and having an axially extending recess receiving said axial projection so that the clutch element is compelled to rotate with said first coupling member, resilient means provided on the cylindrical portion of said second coupling member and arranged to bias said clutch element axially into frictional engagement with said collar so that one of said coupling members may transmit to the other coupling member a driving torque whose magnitude depends on the bias of said resilient means, and a nut meshing with the cylindrical portion of said second coupling member and arranged to regulate the bias of said resilient means in response to angular displacement thereof with reference to said second coupling member, said projection being adapted to move freely out of said axially extending recess in response to movement of one of said coupling units away from the other coupling unit in axial direction so that said coupling units may be readily separated from one another without affecting the bias of said resilient means; and means for driving one of said coupling members.

11. A friction clutch, comprising a first coupling unit including a first rotary coupling member including a cylindrical portion and a cupped portion integral with one end of said cylindrical portion, said cupped portion having a plurality of equidistant axially extending peripheral recesses; a second coupling unit located substantially coaxially with respect to said first coupling unit and coupled to the latter in mere torque transmitting relationship therewith, said second coupling unit including a second rotary coupling member comprising a cylindrical portion coaxial with said first coupling member and a collar provided at one end of said last named cylindrical portion and extending into said cupped portion, said last named cylindrical portion being provided with external threads, an annular clutch element rotatably received on the cylindrical portion of said second coupling member and comprising a plurality of equidistant axial projections each received in one of said recesses so that the clutch element is compelled to rotate with said first coupling member, resilient means provided on the cylindrical portion of said second coupling member and arranged to bias said clutch element axially into frictional engagement with said collar so that said one coupling member may transmit to the other coupling member a driving torque whose magnitude depends on the bias of said resilient means, and a nut meshing with the cylindrical portion of said second coupling member and arranged to regulate the bias of said resilient means in response to angular displacement thereof with reference to said second coupling member, said projections being adapted to move freely out of said axially extending recesses in response to movement of one of said coupling units away from the other coupling unit in axial direction so that said coupling units may be readily separated from one another without affecting the bias of said resilient means; and means for driving one of said coupling members.

References Cited by the Examiner
UNITED STATES PATENTS

| 1,340,811 | 5/1920 | Ballman. | |
| 2,659,220 | 11/1953 | Cherry | 64—30 X |
| 3,092,983 | 6/1963 | Huber | 64—30 |
| 3,208,316 | 9/1965 | Scribner | 64—30 X |

FRED C. MATTERN, JR., *Primary Examiner.*

HALL C. COE, *Examiner.*